July 8, 1952 M. C. J. BILLINGHAM 2,602,764
INSULATION FOR PIPES, CONDUITS, AND THE LIKE
Filed Sept. 9, 1949 2 SHEETS—SHEET 1

INVENTOR.
Milton C. J. Billingham
BY
Attorney.

July 8, 1952  M. C. J. BILLINGHAM  2,602,764
INSULATION FOR PIPES, CONDUITS, AND THE LIKE
Filed Sept. 9, 1949  2 SHEETS—SHEET 2

INVENTOR.
Milton C. J. Billingham
BY
Otto R. Earl
Attorney.

Patented July 8, 1952

2,602,764

UNITED STATES PATENT OFFICE 2,602,764

INSULATION FOR PIPES, CONDUITS, AND THE LIKE

Milton C. J. Billingham, Kalamazoo, Mich.

Application September 9, 1949, Serial No. 114,765

6 Claims. (Cl. 154—44)

This invention relates to improvements in insulation for pipes, conduits and the like and method of applying the same.

The main objects of this invention are:

First, to provide insulation for pipes, conduits and the like which is highly efficient and may be very easily and economically applied.

Second, to provide insulation for conduits and the like formed of cellular material, each member or unit of the insulation consisting of two coacting body sections which when assembled completely embrace the conduit and which are effectively retained in assembled relation without the use of adhesives.

Third, to provide an insulating member or unit for conduits, pipes and the like made up of insulating material which is so mounted and arranged on the conduit that it is not likely to be broken even when installed in positions where it is subject to loads or conditions, such as being walked upon, and one which is capable of providing a substantially continuous top or surface where a series of parallel pipes or conduits are insulated.

Fourth, to provide insulation for conduits and the like having an external covering or wrapping which presents a surface that can be easily washed or otherwise cleaned, is easily applied and moisture-proof and is in such binding engagement with the insulation proper as to prevent any accumulation of moisture within the wrapping.

Fifth, to provide a method of installing insulation which results in a covered insulation, the covering being highly attractive in appearance and providing a surface that can be readily and repeatedly cleaned.

Objects relating to details and economies of the invention will appear from the description to follow. The invention is pointed out in the claims.

A preferred embodiment of the invention is illustrated in the accompanying drawings, in which.

Figure 1:
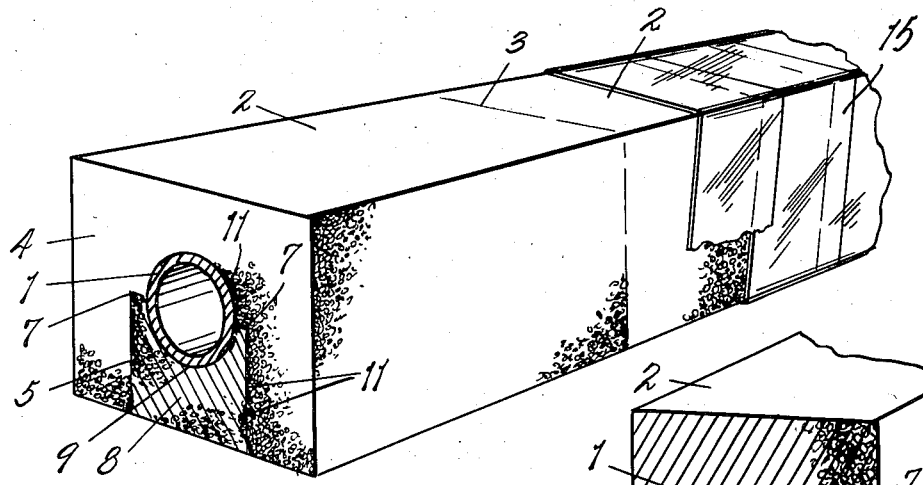
Fig. 1 is a fragmentary perspective view of insulation of my invention applied to a pipe or conduit with the insulation partially covered.
Figure 2:
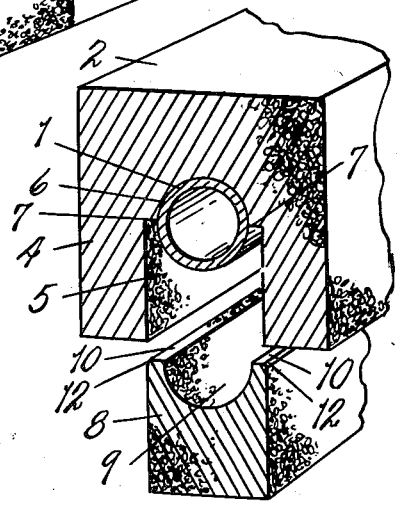
Fig. 2 is a fragmentary perspective view illustrating the steps of assembling the coacting sections upon a pipe or conduit.
Figure 3:
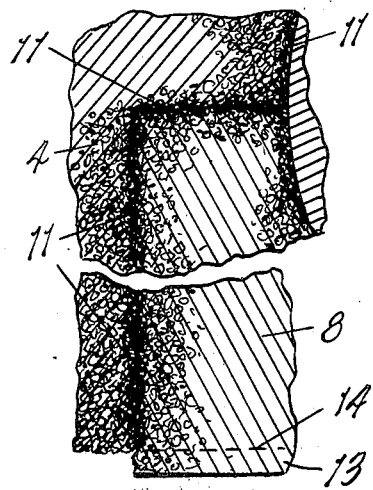
Fig. 3 is an enlarged fragmentary sectional view illustrating further details of the assembling of the insulation on a conduit.

In the accompanying drawing, I represents a pipe or conduit to be insulated. The insulation of my invention comprises a plurality of elongated members or units 2—2 which are arranged on the conduit with their ends in abutting relation as indicated at 3. In the embodiment illustrated in Figs. 1, 2 and 3 the members 2 are of rectangular cross section.

Each insulating member or unit 2 consists of a main body member 4 having a longitudinal outwardly opening channel 5 in one side thereof preferably the underside. This channel is substantially wider than the conduit I to be insulated, the channel being centrally disposed. The inner wall of the channel is provided with a centrally positioned longitudinal conduit receiving groove 6 of curved section and of a width less than the width of the channel providing shoulders 7 at each side of the groove. The groove is desirably of somewhat less diameter than the insulated element.

The auxiliary body member 8 is of a width somewhat exceeding the width of the channel and has a central longitudinal conduit groove 9 in its inner side opposed to the groove 6 of the main body member. The groove 9 is of less diameter than the width of the member 8 providing shoulders 10 adapted to abut the shoulders 7. This groove is also desirably of a diameter less than the diameter of the insulated element and is of a circumferential dimension somewhat exceeding one-half the circumference of the insulating element. This insures that when the member 8 is pressed into the channel of the member 4 that the shoulder portions are brought in meeting compressed engagement. The section 8 being of a width somewhat exceeding the width of the channel 5 is pressed into the channel 5 with its side walls in compressed fitting engagement with the walls of the channel when the sections are formed of cellular material and the walls of the cells of the meeting side surfaces become effectively interlocked. The grooves being of somewhat less diameter than the conduit to be insulated insures that the walls of the grooves shall be in close pressed fitting engagement with the conduit. This insures that there are no spaces between the insulation and the conduit which might collect moisture.

In the accompanying drawing I have indicated the compression of the material at 11. To facilitate the assembling of the sections the inner edges of the auxiliary section 8 are beveled at 12 and the section 8 may, if desired, have an excess of material 13 on its outer edge which is cut off at 14 to insure that the outer side of the auxiliary member shall be flush with the bottom of the main member. That, however, is not necessary as the section 8 may be formed so that its outer side is flush when it is pressed into the channel to the desired extent.

I have used the term main and auxiliary sections or members for convenience in description and identifying the parts. They coact to provide a complete insulating member or unit.

Figure 4:
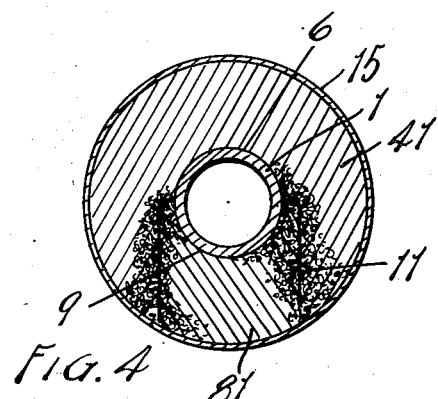
Fig. 4 is a cross sectional view of a modified form or embodiment of my invention showing an adaptation thereof to a circular or cylindrical form and with the covering or wrapping thereon.
Figure 5:
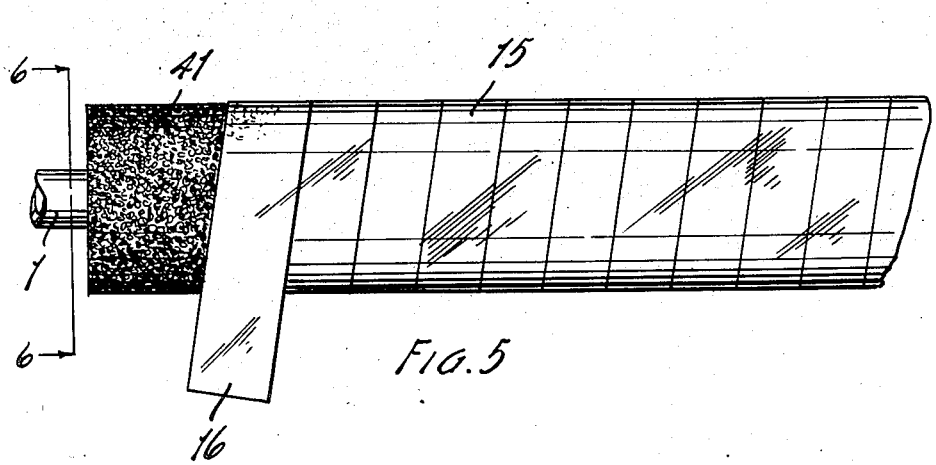
Fig. 5 is a fragmentary elevational view illustrating one of the method steps.
Figure 6:
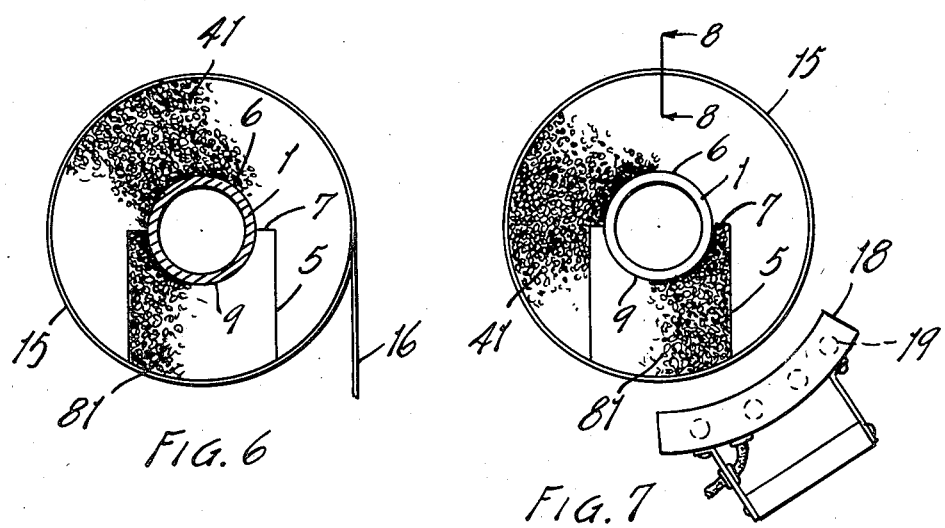
Fig. 6 is a view on a line corresponding to line 6—6 of Fig. 5 showing further details of my method.
Figure 7:
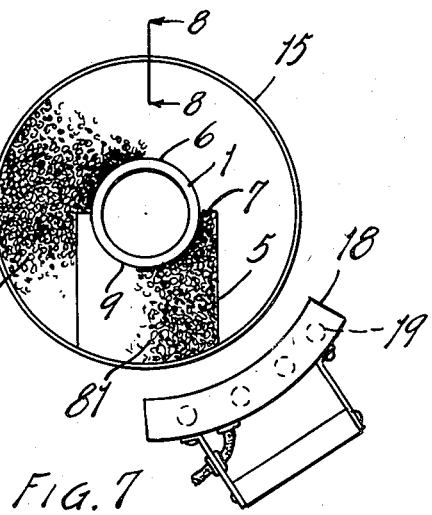
Fig. 7 is an end elevational view of a conduit provided with the insulation of my invention and illustrating a heating device adapted for forming another step of the method.
Figure 8:
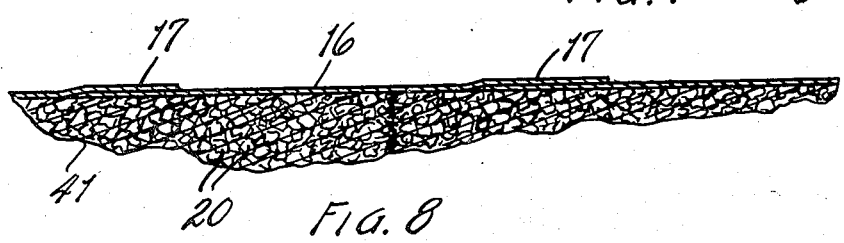
Fig. 8 is an enlarged fragmentary view in longitudinal section on a line corresponding to line 8—8 of Fig. 7.

In Fig. 4 the sections 41 and 81 are externally conformed to a cylindrical shape. In the preferred embodiment of my invention whether it be rectangular or cylindrical I provide an external covering designated generally by the numeral 15. This covering is formed of a strip of material 16 spirally wrapped around the completely assembled insulating members, the material being a synthetic thermoplastic product and desirably transparent and capable of shrinking when heat is applied thereto. This covering is spirally wound with the edges of its wraps in overlapping relation as is shown at 17 in Fig. 8. After the material is wrapped around the assembled insulation it is subjected to heat which causes it to shrink into close embracing relation to the insulation. A heating unit capable of being moved along the conduit or other insulated object is shown at 18 in Fig. 7 and may be electrically heated, the heating elements being indicated at 19. The material is light in weight, water resistant and presents a somewhat glossy surface which does not tend to collect dust or dirt but if dust or dirt should accumulate it can be readily cleaned or wiped off and thoroughly protects the insulation from dirt which is desirable inasmuch as the insulation is of cellular character and affords lodgment for dust and dirt. This surface can be coated, if desired, to cover the outer surface or render it smooth so that it can be readily wiped off or cleaned.

In the accompanying drawing I have indicated at 20 the cellular character of a preferred insulating material. Styrene beaten or blown into a multi-cellular foam and solidified is highly satisfactory; however, other forms of insulating material, such as magnesium, are desirable particularly where insulation for high temperature conduits is desired. Cellular styrene and the exposed edge walls of its cells may be compressed substantially and this insures an effective insulating seal at the joints. The magnesium insulating material is not as compressible but the auxiliary member should have a wedging engagement with the walls of the main member. Cellular styrene is very light in weight and can be compressed sufficiently to readily compensate for variations in a conduit and in the forming of the main or auxiliary members to be assembled, that is, more accuracy is required in the forming when insulating material such as magnesium is used which is relatively noncompressible as compared to cellular styrene and light cellular material.

The satisfactory results with material such as cellular styrene can be easily secured when the grooves are of the order of .064 of an inch less diameter than the conduit to which the insulation is to be applied.

The rectangular section provides approximately 25% more insulation than a cylindrical section and is more economically produced in that it requires much less machining or cutting when formed of slabs of insulating material. Further, if it is not desired to use the external finish wrapping a coating can be troweled or painted upon the insulation more easily than on a cylindrical covering. The coating material may be applied before installing the insulation. Desirably, however, the channel side is coated after the insulation members are assembled. Another advantage in the rectangular section is that the insulation provides a flat top surface.

There are many installations where a cylindrical covering is preferred and my invention is well adapted to both cross sections. I have not attempted to illustrate a material such as magnesium, the insulating qualities of which are known.

I have illustrated and described my invention in a practical commercial embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. Insulation for elements such as pipes, conduits and the like comprising a plurality of elongated members of rectangular section and of cellular compressible material adapted to be disposed end to end in embracing relation to an element to be insulated, each member consisting of a main body section having a longitudinal outwardly opening channel in one side thereof and extending from end to end, the side walls of the channel extending in straight generally parallel relationship to the periphery of the section, the inner wall of the channel being provided with a centrally positioned longitudinal groove of curved section and of less diameter than the width of the channel providing outwardly facing shoulders at each side of the groove, the groove being of slightly less diameter than the insulated element, and an auxiliary section of a width somewhat exceeding the width of the channel and having a centrally positioned longitudinal groove in its inner side of a diameter less than the width of the auxiliary member providing inwardly facing shoulders coacting with said shoulders of said main member, the groove of the auxiliary member being opposed to the groove of the main member and of a diameter slightly less than the diameter of the insulated element and of a circumferential dimension exceeding one-half the circumference of the insulated element, the inner edges of the auxiliary member being beveled to facilitate its compressing fit insertion into the channel of the main member, the auxiliary member being pressed into the channel with the side walls of the channel and auxiliary members and said shoulders in compressed engagement and with the walls of the grooves of the main and auxiliary members in compressed fitting engagement with the insulated element.

2. Insulation for elements such as pipes, conduits and the like comprising a plurality of elongated members of rectangular section and of cellular compressible material adapted to be disposed end to end in embracing relation to an element to be insulated, each member consisting of a main body section having a longitudinal outwardly opening channel in one side thereof and extending from end to end, the side walls of the channel extending in straight generally parallel relationship to the periphery of the section, the inner wall of the channel being provided with a centrally positioned longitudinal groove of curved section and of less diameter than the width of the channel providing outwardly facing shoulders at each side of the groove, the groove being of slightly less diameter than the insulated element, and an auxiliary section of a width somewhat exceeding the width of the channel and having a centrally positioned longitudinal groove in its inner side of a diameter less than the width of the auxiliary member providing inwardly facing shoulders coacting with said shoulders of said main member, the groove of the auxiliary member being opposed to the groove of the main member and of a diameter slightly less than the diameter of the insulated element and of a circumferential dimension exceeding one-half the circumference of the insulated element, the auxiliary member being pressed into the channel with the side walls of the channel and auxiliary members and said shoulders in compressed engagement and with the walls of the grooves of the main and auxiliary members in compressed fitting engagement with the insulated element.

3. Insulation for elements such as pipes, conduits and the like comprising a plurality of elongated members of cellular compressible material adapted to be disposed end to end in embracing relation to an element to be insulated, each member consisting of a main body section having a longitudinal outwardly opening channel in one side thereof and extending from end to end, the side walls of the channel extending in straight generally parallel relationship to the periphery of the section, the inner wall of the channel being provided with a centrally positioned longitudinal groove of less diameter than the width of the channel providing outwardly facing shoulders at each side of the groove, and an auxiliary section of a width somewhat exceeding the width of the channel and having a centrally positioned longitudinal groove in its inner side of a diameter less than the width of the auxiliary member providing inwardly facing shoulders coacting with said shoulders of said main member, the auxiliary member being pressed into the channel with the side walls of the channel and auxiliary members and said shoulders in compressed engagement.

4. Insulation for pipes, conduits and the like comprising a main body member of rectangular cross section having an outwardly opening longitudinal channel disposed centrally in one side thereof, the side walls of the channel extending in continuous planes to the periphery of the section, and extending from end to end, the inner wall of the channel being provided with a longitudinal groove of curved section disposed centrally of the width of the channel, an auxiliary body member having a centrally positioned longitudinal groove of curved section in its inner side complementary to the groove in said main body member, the walls of the grooves in said main and auxiliary body members coacting to embrace an insulated element, the said main and auxiliary members being formed of cellular material and having opposed abutting shoulders at the sides of the grooves, the side walls of the main and auxiliary members being in compressed sealing engagement, the shoulders of the members being also in compressed cell deforming abutting engagement whereby the meeting walls of the cells in the two members are deformed into interlocking relation.

5. Insulation for pipes, conduits and the like comprising a main body member of rectangular cross section having an outwardly opening longitudinal channel disposed centrally in one side thereof and extending from end to end, the inner wall of the channel being provided with a longitudinal groove, an auxiliary body member having a longitudinal groove of curved section in its inner side complementary to the groove in said main body member, said members being formed of cellular material, the walls of the grooves in said main and auxiliary body members coacting to embrace an insulated element, the side walls of the main and auxiliary members being in compressed cell deforming sealing engagement whereby the meeting walls of the cells in the two members are deformed into interlocking relation.

6. Insulation for pipes, conduits and the like comprising a main body member of insulating material having a longitudinal outwardly opening channel, the inner end of the channel being conformed to receive and embrace substantially one-half of a pipe or conduit, and an auxiliary member of the insulating material having its inner wall conformed to embrace the portion of the conduit not embraced by said main body member, said main and auxiliary body members being formed of relatively rigid deformable cellular material and coacting to completely encircle the insulated conduit, the coacting walls of the main and auxiliary body members being in pressure fitting engagement whereby the meeting walls of the cells in the two members are deformed into interlocking relation.

MILTON C. J. BILLINGHAM.

REFERENCES CITED

The following references are of record in the file of this patent:

UNITED STATES PATENTS

| Number | Name | Date |
| --- | --- | --- |
| 1,105,844 | Schaperjahn | Aug. 4, 1914 |
| 1,724,185 | Elias | Aug. 13, 1929 |
| 2,091,335 | Roberts et al. | Aug. 31, 1937 |
| 2,454,625 | Bondon | Nov. 23, 1948 |

FOREIGN PATENTS

| Number | Country | Date |
| --- | --- | --- |
| 14,565 | Denmark | May 15, 1911 |